United States Patent [19]

Ohkumo et al.

[11] Patent Number: 4,834,226

[45] Date of Patent: May 30, 1989

[54] CONTROL SYSTEM FOR AN ELECTROMAGNETIC CLUTCH FOR A VEHICLE

[75] Inventors: Hiroya Ohkumo, Koganei; Ryuzo Sakakiyama, Tokyo, both of Japan

[73] Assignee: Fuji Jukogyo Kabushiki Kaisha, Tokyo, Japan

[21] Appl. No.: 35,561

[22] Filed: Apr. 7, 1987

[30] Foreign Application Priority Data

Apr. 9, 1986 [JP] Japan .................. 61-083120
Apr. 9, 1986 [JP] Japan .................. 61-083123

[51] Int. Cl.$^4$ ............................................. F16D 37/02
[52] U.S. Cl. ....................... 192/0.033; 192/21.5; 192/103 R; 192/103 C
[58] Field of Search ............ 192/0.033, 0.055, 21.5, 192/103 C, 103 R

[56] References Cited

U.S. PATENT DOCUMENTS

| 3,610,362 | 10/1971 | Toyama et al. | 192/13 R X |
| 3,817,358 | 6/1974 | Hess | 192/0.033 |
| 3,863,730 | 2/1975 | Wakamatsu et al. | 192/13 R X |
| 4,509,625 | 4/1985 | Tellert | 192/0.033 |
| 4,730,709 | 3/1988 | Kawata et al. | 192/103 C |
| 4,732,248 | 3/1988 | Yoshimura et al. | 192/0.055 |

FOREIGN PATENT DOCUMENTS

| 0153051 | 8/1985 | European Pat. Off. | 192/0.033 |
| 2083588 | 3/1982 | United Kingdom | 192/0.033 |

*Primary Examiner*—Rodney H. Bonck
*Attorney, Agent, or Firm*—Martin A. Farber

[57] ABSTRACT

A system for disengaging an electromagnetic clutch of a vehicle at rapid deceleration of the vehicle. The rapid deceleration is detected by changing rate of engine speed when the magnitude of deceleration is larger than a reference value, the electromagnetic clutch is disengaged at an engine speed which is higher than idling speed.

5 Claims, 8 Drawing Sheets

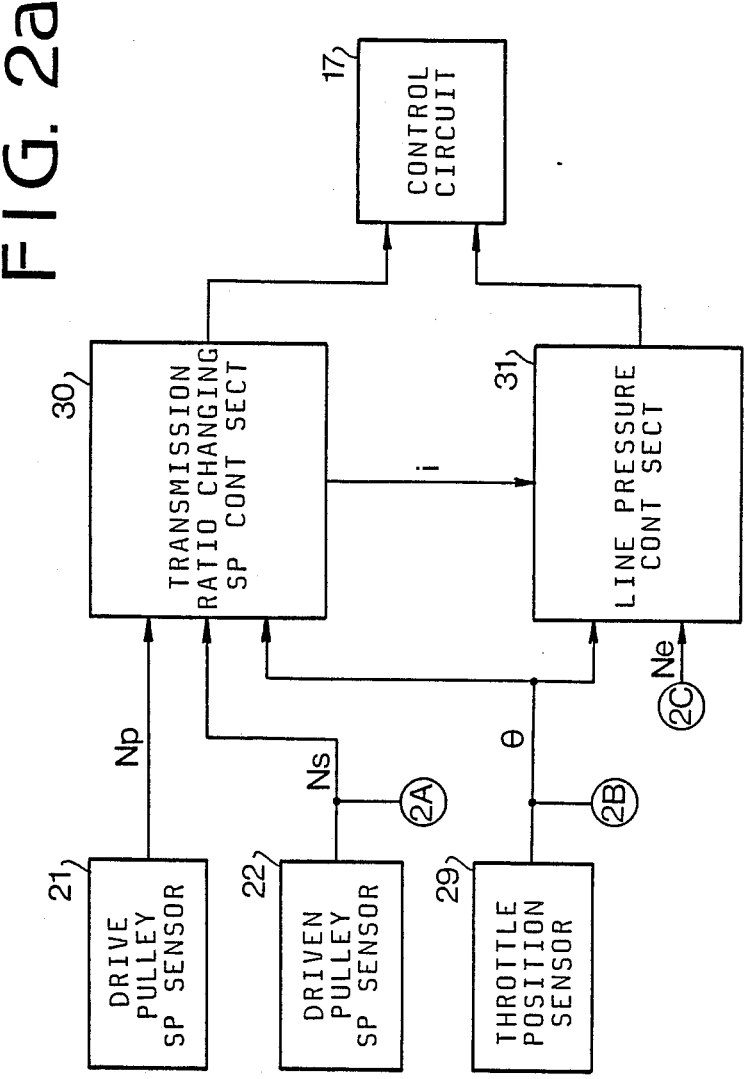

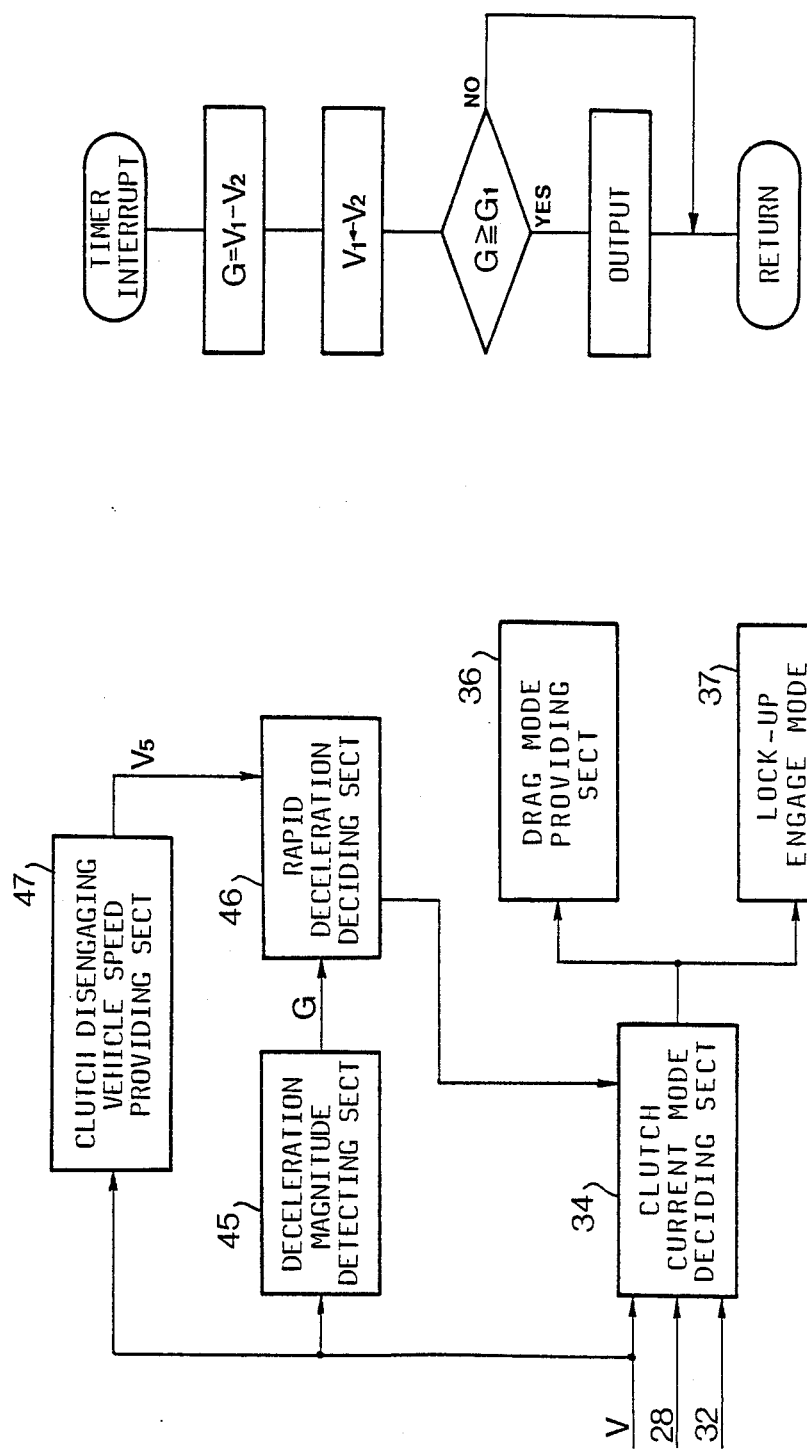

CONTROL SYSTEM FOR AN ELECTROMAGNETIC CLUTCH FOR A VEHICLE

BACKGROUND OF THE INVENTION

The present invention relates to a control system for an electromagnetic clutch for an automatic transmission of a motor vehicle.

An automobile provided with a continuously variable belt-drive transmission with an electromagnetic clutch is disclosed in EP-A 151038. The electromagnetic clutch of the transmission is controlled by a control system to provide various operational modes for clutch torque (clutch current). One of the modes is selected in accordance with a position of a selector lever and driving conditions of the vehicle to control the electromagnetic clutch.

At a start of the vehicle, the clutch torque is raised in proportion to the engine speed or the opening degree of a throttle valve of the engine. When the vehicle speed reaches a predetermined speed, the clutch is entirely engaged by a lock-up current. When the vehicle speed decreases below a predetermined speed, the clutch is disengaged to prevent stalling of the engine. Generally, the vehicle speed is detected by counting pulses proportional to the speed.

On the other hand, when the vehicle speed is suddenly braked by quickly and greatly depressing a brake pedal, the deceleration of the vehicle becomes very large. When the vehicle is decelerated, the pulse separation of the pulses becomes long. As a result, the detection of the predetermined speed for disengaging the clutch is delayed.

Thus, the disengagement of the clutch is delayed, causing a decrease of engine speed or stalling of the engine because of overload on the engine. Particularly, on a snowy road, wheels are liable to be rapidly locked by braking, delaying the disengagement of the clutch.

In order to solve the problem, it may be preferable to set the predetermined vehicle speed for disengaging the clutch at a high speed. However, in such a system, since the clutch is disengaged at the high vehicle speed, the engine braking effect reduces.

SUMMARY OF THE INVENTION

The object of the present invention is to provide a control system which operates to prevent the decrease of engine speed at large deceleration of the vehicle speed with a sufficient engine braking effect.

The other objects and features of this invention will become understood from the following description with reference to the accompanying drawings.

BRIEF DESCRIPTION OF DRAWINGS

FIGS. 2a and 2b show a block diagram of a control unit according to the present invention;

FIG. 7 is a block diagram of a main part of the system of the embodiment;

FIG. 8 is a flow chart showing the operation of the system.

DETAILED DESCRIPTION OF THE PREFERRED EMBODIMENT

Figure 1:
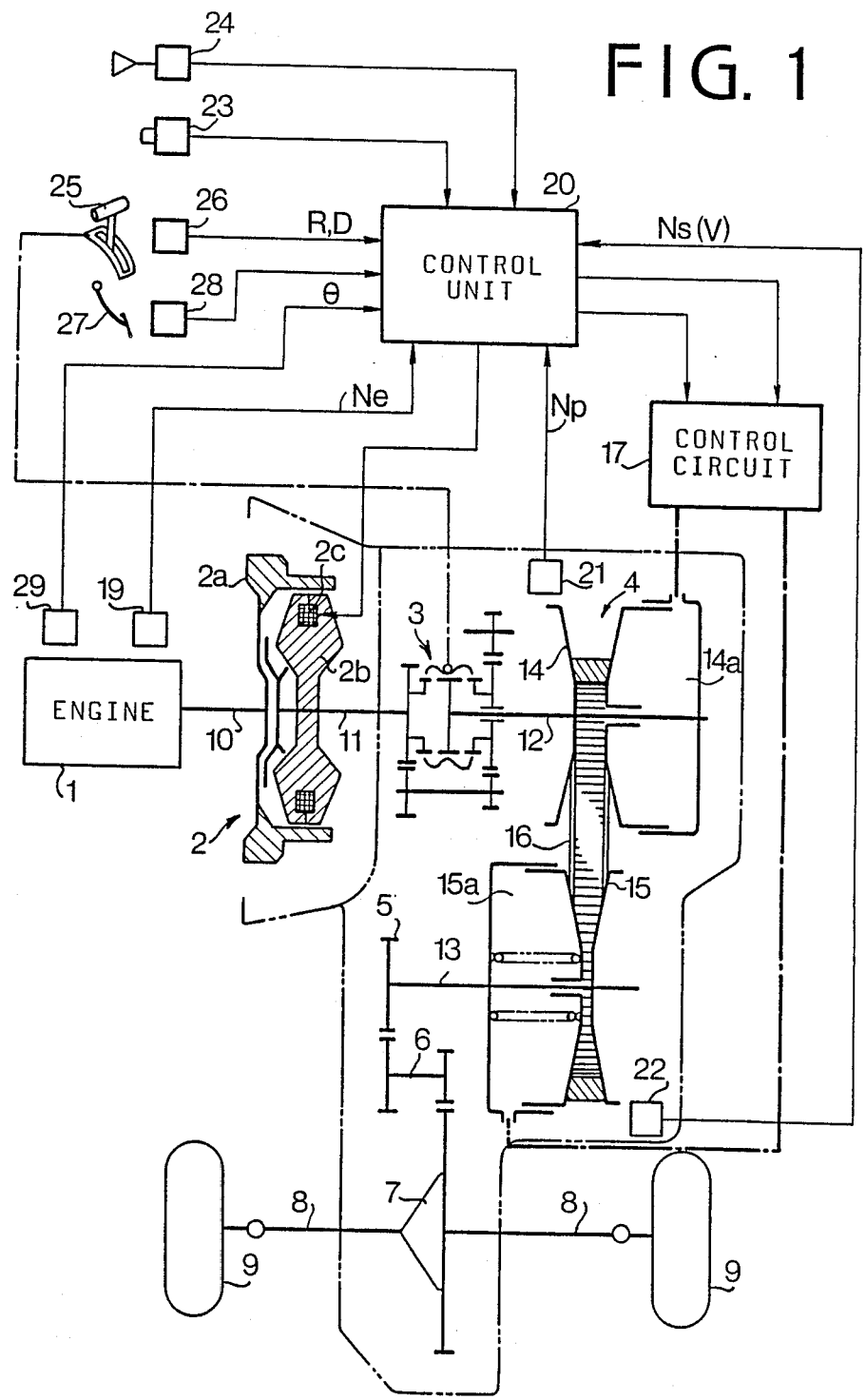
FIG. 1 is a schematic illustration of a system for controlling an electromagnetic clutch for a motor vehicle.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to crankshaft 10 of the engine 1, a driven member 2b secured to an input shaft 11 of the transmission 4, and a magnetizing coil 2c provided in the driven member 2b. Magnetic powder material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and a sleeve for connecting the input shaft 11 and the main shaft 12 to selectively provide a driving position (D-range) and a reverse driving position (R-range).

The continuously variable belt-drive automatic transmission 4 has the main shaft 12 and an output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit 17. The hydraulic control circuit 17 is responsive to vehicle speed, engine speed and throttle valve position for controlling the amount of oil supplied to the cylinders 14a and 15a. The pulleys 14 and 15 are operated by compressive forces in the cylinders so that the running diameter of belt 16 is varied to infinitely change the transmission ratio.

An electronic control system for the clutch 2 and the belt-drive transmission 4 has an engine speed sensor 19, and rotating speed sensors 21 and 22 for respectively sensing speeds of the drive pulley 14 and the driven pulley 15. A choke switch 24 produces an output signal when a choke valve of the engine 1 is closed, and an air conditioner switch 23 produces an output signal during the operation of an air conditioner. A selector lever 25 connected to the selector mechanism 3 is provided with a select position sensor 26 for sensing a drive position D and a reverse position R. An accelerator pedal switch 28 is provided for sensing the depression of an accelerator pedal 27, and a throttle position sensor 29 is provided.

Output signals of the sensors and pulses of the switches are applied to an electronic control unit 20 which produces a clutch current control signal to the clutch 2 and a control signal for controlling the transmission ratio (i) of the transmission and a line pressure control singal to the control circuit 17.

Figure 2B:
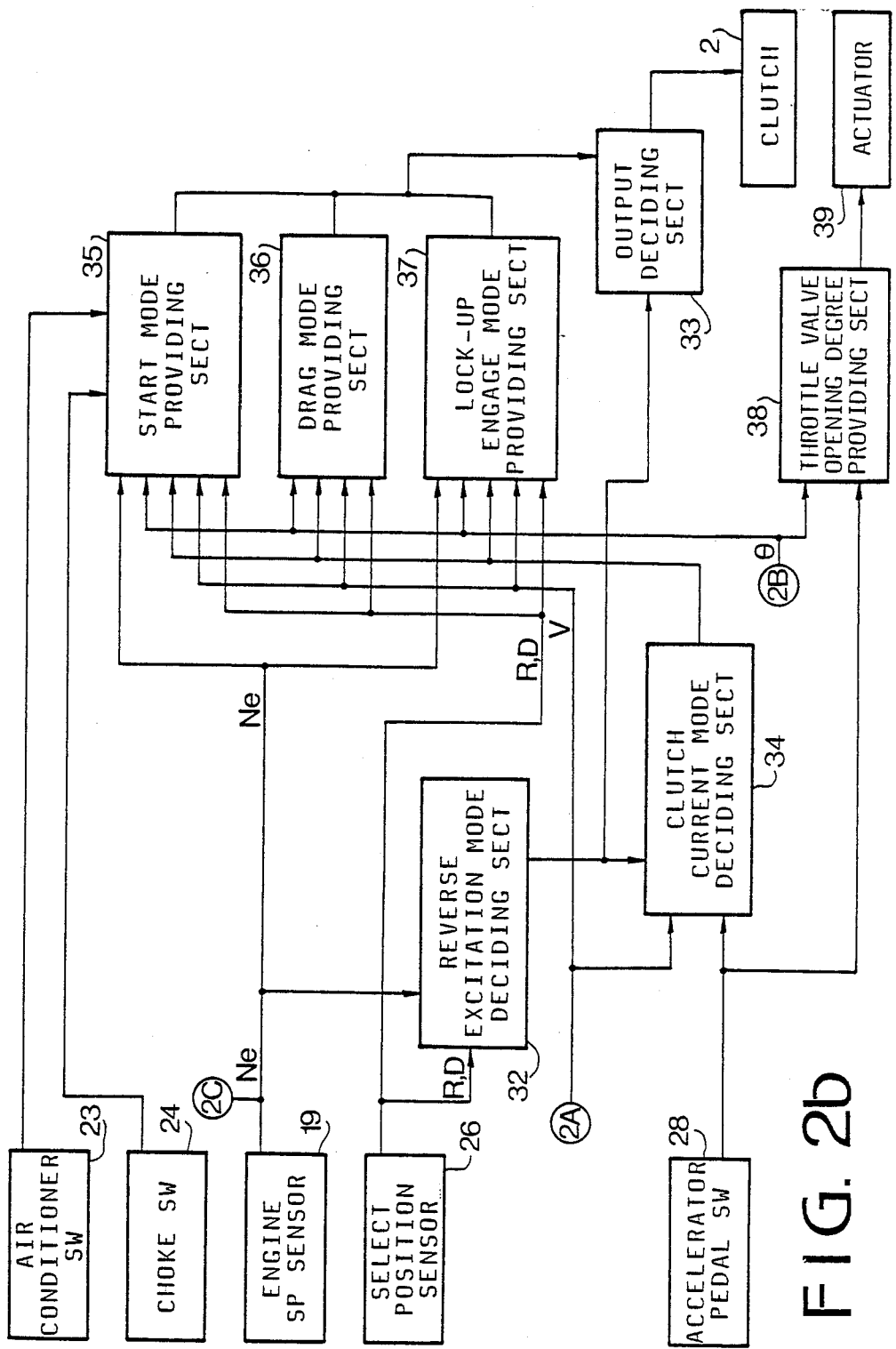

Referring to FIGS. 2a and 2b showing the control unit 20 of FIG. 1, a transmission ratio changing speed control section 30 is applied with a drive pulley speed signal $N_P$ of the sensor 21, driven pulley speed signal $N_S$ of the sensor 22, and throttle position signal $\theta$ of the sensor 29 to produce the transmission ratio control signal dependent on a desired transmission ratio changing speed di/dt. A line pressure control section 31 is applied with an engine speed signal Ne of the sensor 19, throttle position signal $\theta$ of the sensor 29, and an actual transmission speed ratio signal i ($N_S/N_P$) of the transmission ratio changing speed control section 30 to produce the line pressure control signal dependent on a desired line pressure. These control signals are applied to the control circuit 17 to control the transmission ratio and line pressure of the transmission 4.

A reverse excitation mode deciding section 32 is applied with the engine speed signal Ne of the sensor 19 and drive position signal of the select position sensor 26. When the engine speed Ne is below 300 rpm, or the selector lever 25 is at a neutral position (N-range) or a parking position (P-range), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal V from driven pulley speed sensor 22 for deciding driving conditions such as starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed Ne at an ordinary start or at closing of the choke switch 24 or air conditioner switch 23. The starting characteristic is corrected by signals from the throttle valve opening degree $\theta$, vehicle speed V, and driving positions of the D-range and R-range.

The drag mode providing section 36 decides a small drag current when the accelerator pedal 27 is released at a low speed in each drive position for providing a drag torque to the clutch 2 for a smooth start of the vehicle.

Figure 3:
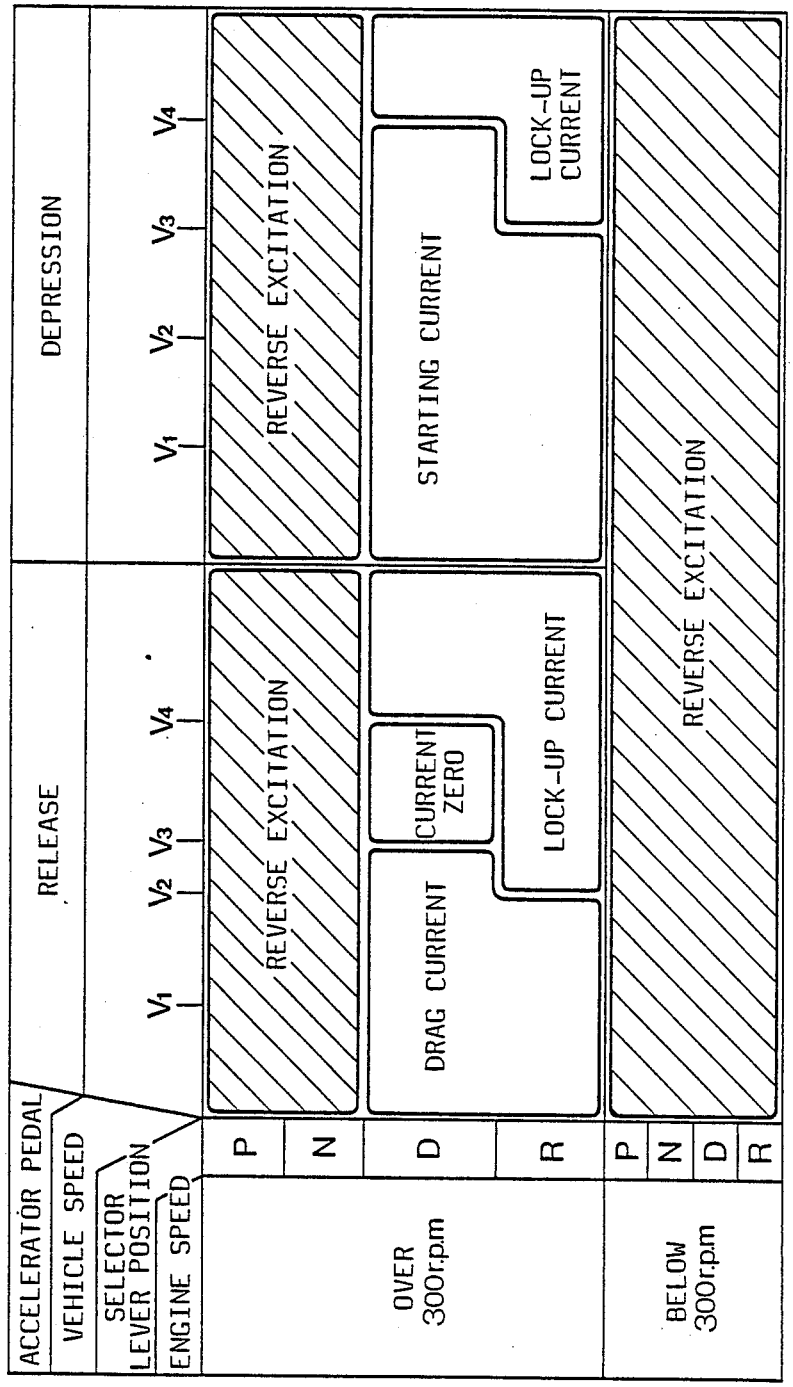
FIG. 3 is a graph showing regions of various modes.

The clutch lock-up engage mode providing section 37 decides a lock-up current in response to the vehicle speed V and throttle opening degree $\theta$ at each drive position for entirely engaging the clutch 2. Outputs of sections 35, 36 and 37 are applied to the output deciding section 33 to control the clutch current. A range of each mode is shown in FIG. 3.

Output signals from the throttle valve position sensor 29 and accelerator pedal switch 28 are applied to a throttle valve opening degree providing section 38 for operating an actuator 39 in accordance with the difference between both signals. Thus, the opening degree of a throttle valve is decided.

Figure 4:
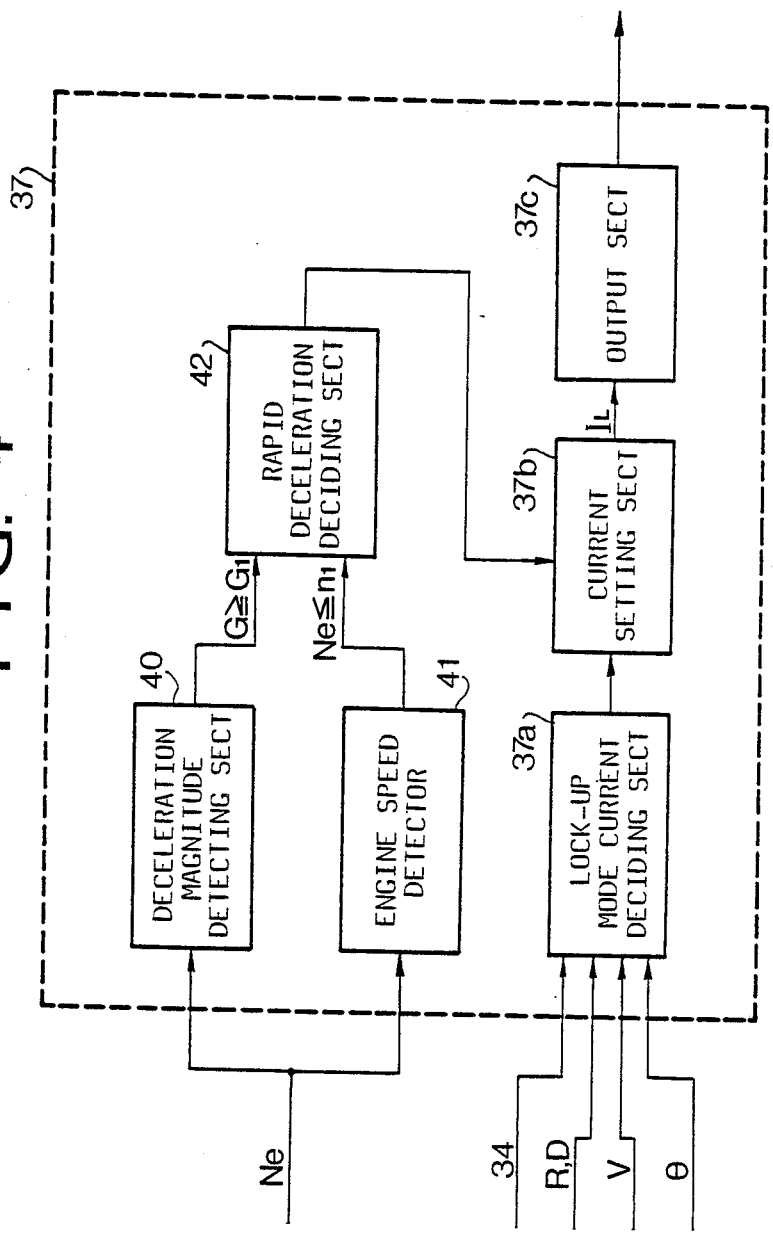
FIG. 4 is a block diagram of a main part of the system according to the present invention.

Referring to FIG. 4, the clutch lock-up engage mode providing section 37 has a deceleration magnitude detecting section 40 which is applied with the engine speed signal Ne to make a calculation of the magnitude of deceleration G given by $-dNe/dt$. The deceleration magnitude G is compared with a predetermined reference deceleration G1. When the deceleration magnitude G is larger than or equal to the predetermined deceleration G1 (G$\geq$G1), the section 40 produces an output signal which is applied to a rapid deceleration deciding section 42. Further, in order to detect a lower limit engine speed for disengaging the clutch, an engine speed detector 41 is provided. The detector 41 is applied with the engine speed signal Ne and produces a lower limit signal when the engine speed decreases to or below a predetermined engine speed $n\uparrow$ which is higher than an idling speed NId. The lower limit signal is applied to the rapid deceleration deciding section 42. In response to both the output signals, the rapid deceleration deciding section 42 produces a rapid deceleration signal.

The clutch lock-up engage mode providing section 37 is further provided with a lock-up mode current deciding section 37a applied with signals of throttle valve opening degree $\theta$, vehicle speed V, drive position R-range and D-range, and output signal of clutch current mode deciding section 34. A current setting section 37b is provided for determining various currents in responsive to input signals from sections 42 and 37a to produce a current signal $I_L$ which is applied to an output section 37c.

The operation of the system will be described hereinafter.

At the ordinary deceleration, the lock-up current engage mode is changed to the drag mode at a predetermined vehicle speed V4 or V2, set in the clutch current mode deciding section 34. The clutch current becomes zero or is changed to the drag current to release the clutch 2.

At rapid deceleration, the rapid deceleration deciding section 42 produces the rapid deceleration signal in accordance with output signals of the sections 40 and 41.

Figure 5:
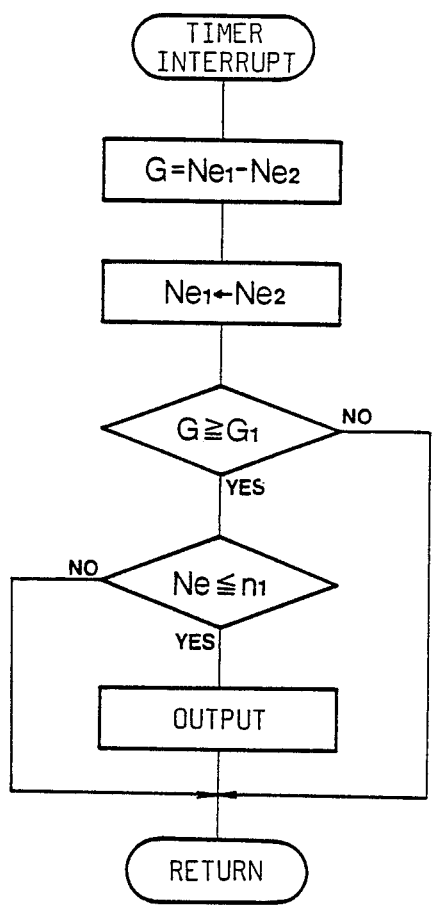
FIG. 5 is a flow chart showing the operation of the system.

FIG. 5 shows an interrupt routine at the deceleration magnitude detecting section 40 and the engine speed detector 41. The deceleration G is given by subtracting an engine speed Ne2 at the present program from an engine speed Ne1 at the last program. The present engine speed Ne2 is stored in a memory for the next program. When the deceleration G is larger than the predetermined reference deceleration G1, and engine speed Ne is lower than the set speed n1, the decision of rapid deceleration is made.

The resultant rapid deceleration signal of the section 42 is applied to the current setting section 37b, and the lock-up current is cut off by the signal from the section 42 to disengage the clutch 2. Thus, the engine 1 is prevented from reducing in speed.

When the vehicle speed is decreased below V2 or V3, the cut off mode of the clutch is changed to the drag mode to keep the release of the clutch. Thus, a drag torque is provided to the clutch 2. When the accelerator pedal is depressed, the mode of the clutch is changed to the start mode.

Figure 6:
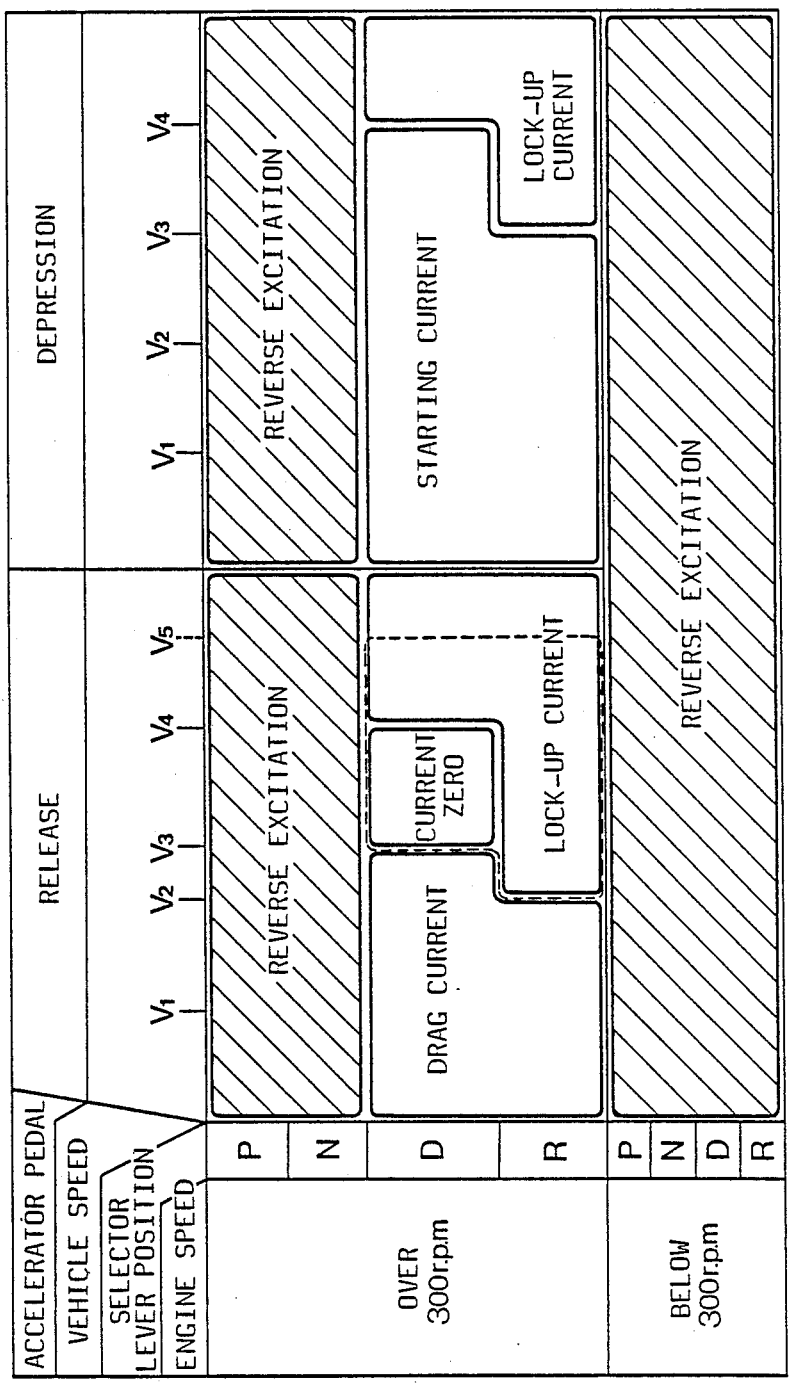
FIG. 6 is a graph showing regions of various modes of a system for another embodiment of the present invention.

FIGS. 6 to 8 show another embodiment of the present invention. In this embodiment, a clutch release operation is operated in the clutch current mode deciding section 34.

Referring to FIG. 7, a deceleration magnitude detecting section 45 is applied with the vehicle speed signal V from driven pulley speed sensor 22 (FIG. 2) and calculates a deceleration magnitude G ($G = -dv/dt$). The deceleration magnitude G is applied to a rapid deceleration deciding section 46 and compared with a predetermined deceleration G1. The rapid deceleration is decided, when the deceleration G is larger than or equal to the predetermined deceleration G1 ($G \geq G1$). A clutch disengaging vehicle speed providing section 47 is applied with the vehicle speed V for providing a predetermined vehicle speed V5 which is higher than the ordinary disengaging speed V4. The output signal of the section 47 is applied to the rapid deceleration deciding section 46. At rapid deceleration, the vehicle speed V5 is applied from the section 46 which outputs a rapid deceleration signal to the clutch current mode deciding section 34 so as to cut off the clutch current at the speed. In response to the output signal of the section 34, the lock-up engage mode of the clutch is changed to the drag mode to cut off the clutch current.

In operation, as shown in FIG. 8, the deceleration magnitude G is given by subtracting an engine speed V2 at present program from a vehicle speed V1 at the last program. The present engine speed V2 is stored in a memory for the next program. When the magnitude G of deceleration is larger than the reference deceleration G1, the section 46 produces the output rapid deceleration signal.

The output signal is applied to the clutch current mode deciding section 34, so that as shown by the dotted line in FIG. 6, the clutch current is cut off at the vehicle speed V5 to disengage the clutch 2.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a power transmitting device of a vehicle having an electromagnetically controlled clutch for operatively transmitting power of an engine of the vehicle to an automatic controlled transmission operatively connected with wheels of the vehicle, the control system comprising an engine speed sensing means for producing an engine speed signal responsive to the rotary speed of the engine, and decision means for controlling current applied to said eletromagnetically controlled clutch in response to operating conditions of the vehicle, the improvement in the system comprising, deceleration detecting means for calculating deceleration magnitude responsive to said engine speed signal and for producing a deceleration magnitude signal when said deceleration magnitude is at least equal to a predetermined deceleration value, engine speed detecting means responsive to said engine speed signal for producing a lower limit signal when the engine speed decreases to between at most a predetermined engine speed higher than an idling speed of the engine and said idling speed of the engine, and rapid deceleration deciding means responsive to occurrence of both said deceleration magnitude signal and said lower limit signal for producing and applying a rapid deceleration signal to said decision means to disengage the electromagnetically controlled clutch, so as to prevent delaying of disengagement of the clutch caused by engine stalling or braking lock of the wheels.

2. The control system according to claim 1, wherein said decision means is a current setting section.

3. The control system according to claim 2, wherein said decision means comprises a lock-up mode current deciding section having an output connected to said current setting section.

4. In a control system for a power transmitting device of a vehicle having an electromagnetically controlled clutch for operatively transmitting power of an engine of the vehicle to an automatic controlled transmission operatively connected with wheels of the vehicle, the control system comprising a vehicle speed sensing means for producing a vehicle speed signal dependent on vehicle speed, and decision means for controlling current applied to said electromagnetically controlled clutch in response to operating conditions of the vehicle, the improvement in the system comprising deceleration detecting means for calculating deceleration magnitude responsive to said vehicle speed signal and for producing a deceleration magnitude signal when said deceleration magnitude is at least equal to a predetermined deceleration value, vehicle speed detecting means responsive to said vehicle speed signal for producing a lower limit signal when the vehicle speed decreases to between at most a predetermined vehicle speed higher than an ordinarily disengaging speed for disengaging the clutch and said ordinarily disengaging speed, and rapid deceleration deciding means responsive to occurrence of both said deceleration magnitude signal and said lower limit signal for producing and applying a rapid deceleration signal to said decision means to disengage the electromagnetically controlled clutch, so as to prevent delaying of disengagement of the clutch caused by engine stalling or braking lock of the wheels.

5. The control system according to claim 4, wherein said decision means is a clutch current mode deciding section.

* * * * *